Nov. 12, 1968  T. A. HARRIS ET AL  3,410,618

ANTI-SKID BEARING

Filed March 23, 1967  4 Sheets-Sheet 1

INVENTORS:
TEDRIC A. HARRIS
STEPHEN F. AARONSON
BY Howson & Howson
ATTYS.

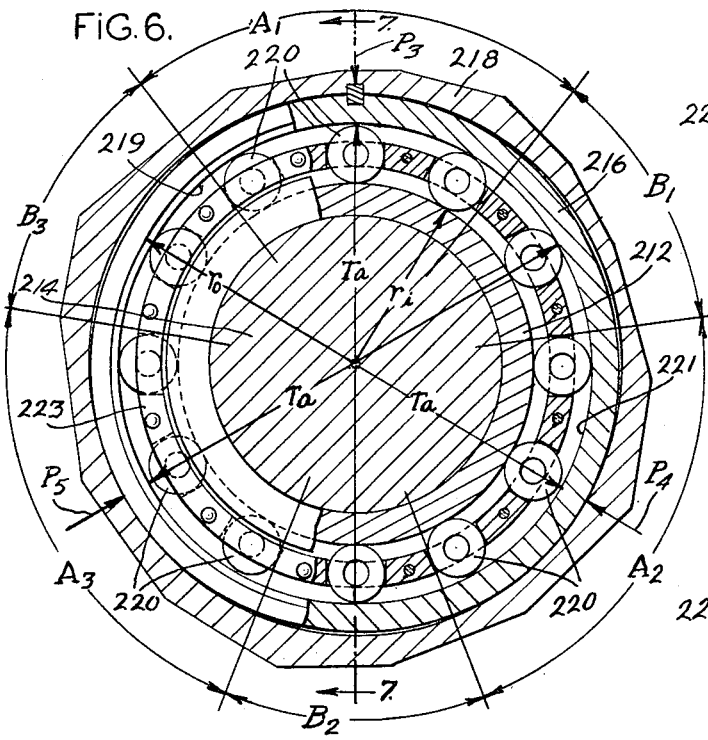
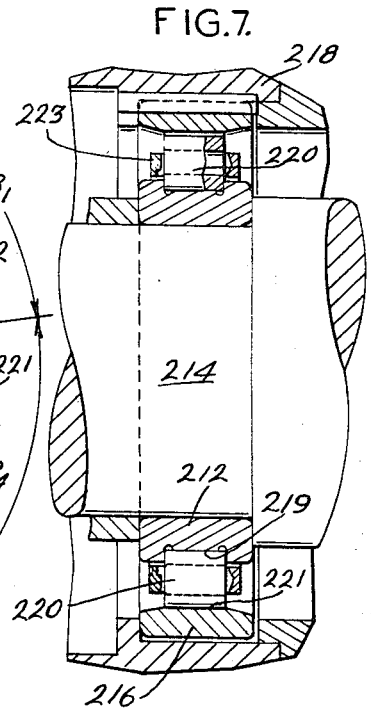
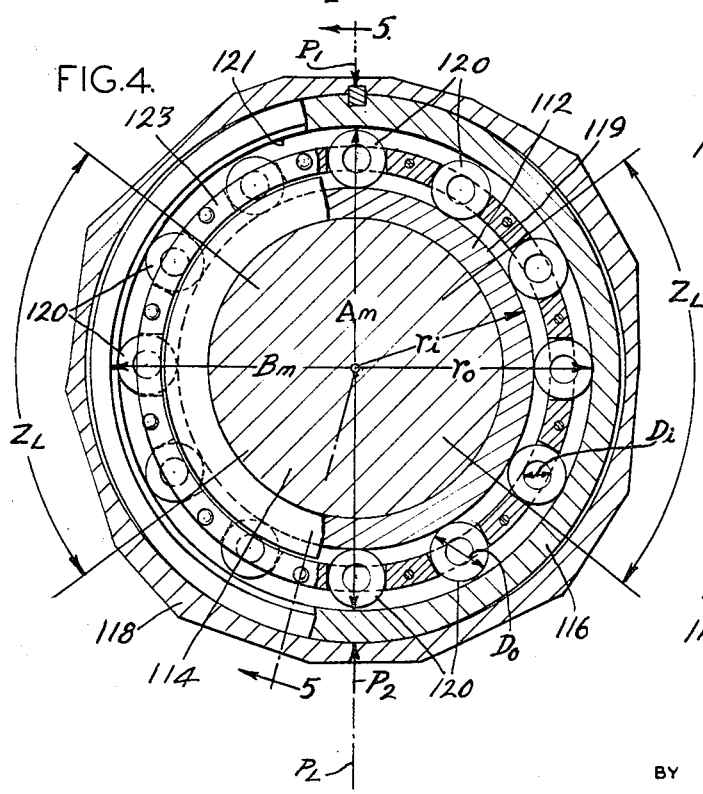
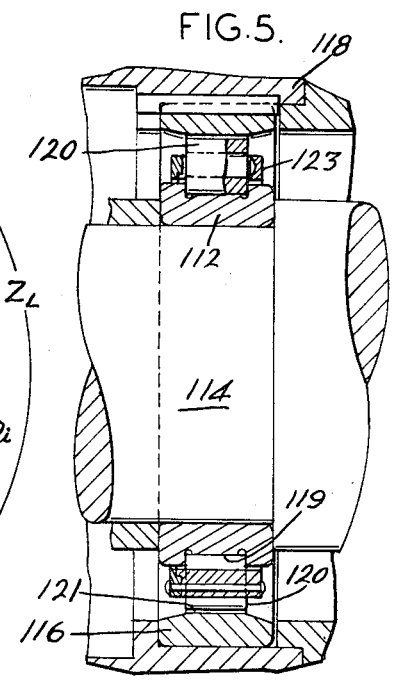

INVENTORS:
TEDRIC A. HARRIS
STEPHEN F. AARONSON
BY
Howson & Howson
ATTYS.

3,410,618
                                    Patented Nov. 12, 1968

3,410,618
ANTI-SKID BEARING
Tedric A. Harris, Warminster, and Stephen F. Aaronson, Philadelphia, Pa., assignors to SKF Industries, Inc., King of Prussia, Pa., a corporation of Delaware
Filed Mar. 23, 1967, Ser. No. 625,481
8 Claims. (Cl. 308—212)

ABSTRACT OF THE DISCLOSURE

An anti-skid roller bearing assembly having inner and outer rings spaced apart to define an annular space between the inner and outer raceways, a plurality of rollers in the annular space between the rings, the rollers being hollow and there being an interference fit between the raceways and rollers to minimize skidding and thereby increase endurance of the assembly particularly in high speed, light load applications. Preferably, the percent hollowness of the rollers for a bearing assembly wherein the inner and outer raceways are concentric is between 60% and 70% and the ratio of the total operating interference between the rollers and the raceways defined as I to the outside diameter $D_o$ of the rollers is between 0.001 and 0.0015, this latter ratio being referred to herein as preload factor P.

---

This invention relates to bearing assemblies and more particularly to a new and improved roller bearing assembly having novel features of construction and arrangement providing an increased resistance to fatigue over a comparatively long period of use.

The term "fatigue life" as used in connection with roller bearing assemblies means that period of service limited by fatigue phenomena. Fatigue of the bearing material results from repeated stress under rotation. The effect of fatigue is a spalled area or smear on one or more of the load-carrying surfaces. The term "fatigue life" as used in the specification means, for example, that number of hours under given test conditions which is reached or exceeded by a given percentage of the bearings tested. This "fatigue life" is designated by the letter L followed by a number subscript. Thus, $L_{10}$ indicates that only 10 percent of a given lot of bearings have failed due to fatigue phenomena after a stated number of test hours.

A typical application where roller bearing assemblies are used is one wherein the bearing assembly is subjected to radial load. These bearing assemblies generally comprise inner and outer rings spaced apart to define an annular space between the raceways for a plurality of solid rollers and a cage for circumferentially spacing the rollers. In some of these radial roller bearing applications, inner raceway speed is relatiely slow and radial load is sufficiently large to assure non-sliding contact between a substantial number of the rollers and the inner and outer raceways in the loaded zone of the bearing. Since the rollers are spaced by a cage, roller orbital speed is commonly referred to as "cage speed." In these applications, the rollers tend toward true rolling and there is little or no skidding between the rollers and the raceways in the loaded zone of the bearing which can cause surface distress such as smearing which condition tends toward early fatigue failure of the bearing surfaces. However, in certain applications, skidding of the rollers in the loaded zone is a serious problem contributing to premature failure of the bearing assembly. For example, in the main shaft bearings in aircraft gas turbines the inner raceway speed may be as high as 20,000 r.p.m., and the bearing radial loading may be very light, consisting only of the rotor weight and small unbalance. Because of the high speeds, roller centrifugal loading tends to increase clearance and thus reduce the number of rollers contacting the inner raceway. Since bearing radial load is light, roller centrifugal loading may be of like and often greater magnitude compared to the loading between the inner raceway and the roller. Consequenty, frictional drag forces at the outer raceway tend to exceed frictional driving forces at the inner raceway, and at the point of contact between the inner raceway and the roller, a translatory movement occurs when the roller is in the loaded zone. In other words, the inner raceway slides or skids past the roller surface. As noted above, skidding of this type can be detrimental to the service life of the bearing and causes surface distress such as smearing which tends toward early fatigue failure of the bearing. Under these operating conditions conventional bearings often fail in a comparatively short period of use, in some instances, less than 100 hours.

In accordance with the present invention, it has been found that skidding in roller bearings may be reduced considerably and hence the resistance of roller bearing assemblies to fatigue may be increased substantially by a bearing assembly having hollow rollers within a predetermined percent hollowness range and which rollers are preloaded by selectively controlling the diametral clearance between the rolling elements and the raceways. More specifically it has been found that optimum operating characteristics are obtained in a bearing wherein the annulus diameter $D_i$ of each roller to the outside diameter $D_o$ is in the ratio of 0.60 to 0.70 and the ratio of the total operating interference between the rollers and raceways expressed herein as I and the outer diameter of each roller $D_o$ is between 0.0010 and 0.0015 inch. More particularly, I is defined as the negative difference between the outer and inner radii $r_o$ and $r_i$ of the raceways less the outside diameter $D_o$ of a roller. The bearing assembly having this particular construction will operate with minimum cage and roller speed slippage and a minimum roller bending stress while optimizing the $L_{10}$ fatigue life of the bearing and has been found particularly useful in applications of high rotational speed and light load such as in the main shaft bearings in aircraft gas turbine engines. In the preferred ranges set forth above, the various factors affecting bearing wear are balanced to provide an assembly having an optimum fatigue life in operation. For example, excessive roller bending stress and cage speed slip adversely affect bearing endurance. For example, it has been observed that cage slip fraction is reduced even further when the preload factor P is increased beyond the upper limit of the preferred range. By contrast, however, the roller bending stresses increase and hence bearing fatigue life would be affected adversely. On the other hand, it has been found that when the preload factor P is less than the lower limit of the preferred range, the percent of cage slip fraction increases which means that skidding increases and hence bearing fatigue life is also affected adversely.

With the foregoing in mind an object of the present invention is to provide a roller bearing assembly exhibiting an increased resistance to fatigue particularly in applications where the raceway speed is high and the radial load is comparatively light.

Another object of the present invention is to provide a novel roller bearing assembly which is easy and economical to make and extremely effective for the purposes intended.

Still another object of the present invention is to provide a novel roller bearing assembly which may be assembled easily.

A further object of the present invention is to provide a roller bearing assembly wherein the overall weight is reduced with the use of hollow rollers.

A still further object of the present invention is to provide a novel roller bearing assembly which has increased heat removal capabilities.

These and other objects of the present invention and the various specific details of the the construction of the bearing assembly in accordance with the present invention are hereinafter more fully set forth with reference to the accompanying drawings, wherein:

FIG. 4 is a view similar to FIG. 1 of another embodiment of rolling bearing in accordance with the present invention;

FIG. 5 is a sectional view taken on lines 5—5 of FIG. 4;

FIG. 6 is a side elevational view partly in section of still another embodiment of rolling bearing in accordance with the present invention;

FIG. 7 is a sectional view taken on lines 7—7 of FIG. 6;

Figure 1:
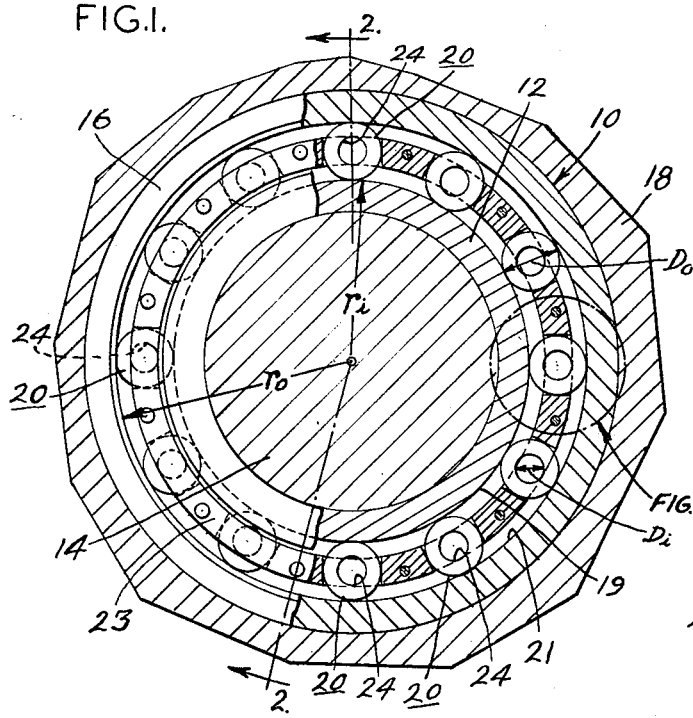
FIG 1 is a side elevational view partly in section of a roller bearing assembly in accordance with the present invention.
Figure 2:
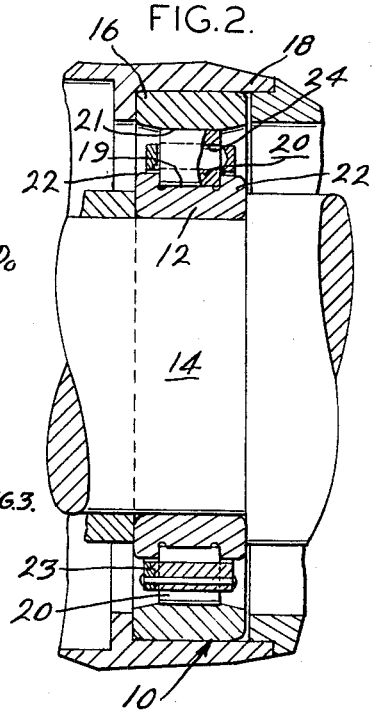
FIG. 2 is a sectional view taken on line 2—2 of FIG. 1.
Figure 3:
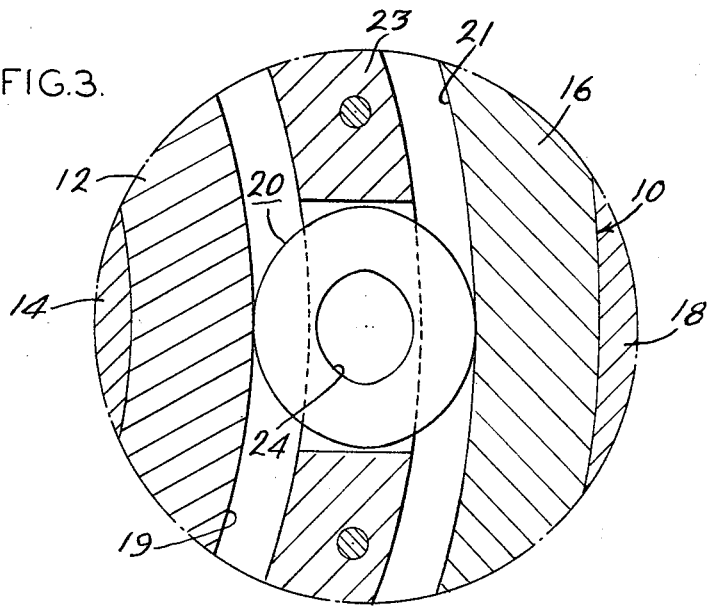
FIG. 3 is an enlarged fragmentary view of the circled portion of FIG. 1.
Figure 8:
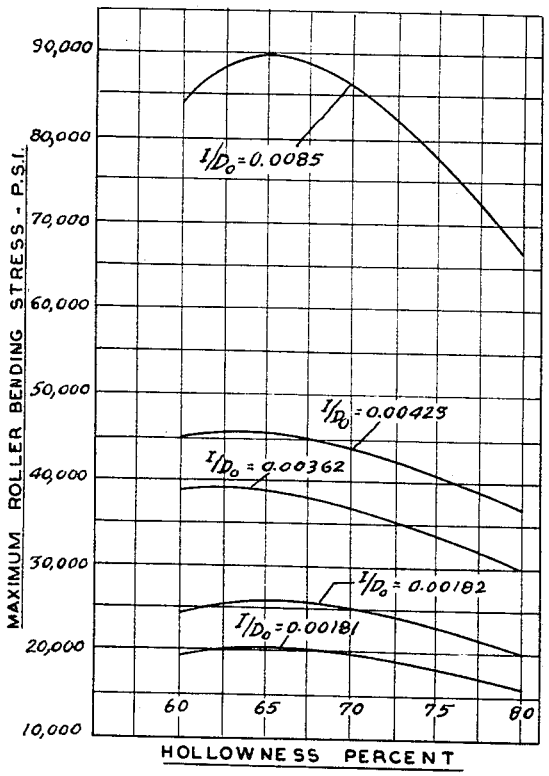
FIG. 8 is a chart showing roller bending stress in relation to percent roller hollowness for the first embodiment of the invention.

Referring now to the drawing and particularly to FIGS. 1–3 thereof, there is illustrated a roller bearing assembly in accordance with the present invention generally designated by the numeral 10. As illustrated, the assembly includes an inner ring 12 mounted on a rotatable shaft 14, an outer ring 16 supported, for example, in a housing 18, and a plurality of rollers 20 in the annular space between the inner and outer raceways 19 and 21 of the rings. In the present instance, the inner ring 12 has circumferentially extending radially outwardly projecting side flanges 22 on either side of the inner raceway 19 to limit axial displacement of the rollers. The assembly further includes a conventional cage 23 for circumferentially spacing the rollers of the assembly.

In accordance with the present invention the bearing assembly is characterized by novel features of construction and arrangement providing an increased resistance to fatigue particularly in applications where the inner raceway speed is extremely high and the bearing radial loading is comparatively light such as in high speed gas turbine shafting. To this end, in accordance with the present invention each of the rollers 20 is hollow having an axially extending, generally cylindrical opening 24 extending therethrough and the rollers are preloaded by controlling the space between the raceway so that it is less than the roller diameter $D_o$ and hence, there is provided a diametral interference between the rollers and the raceways. More specifically, it has been found that optimum bearing performance, that is, greater fatigue life, is achieved when the ratio of the outer diameter $D_o$ to the diameter of the roller bore $D_i$ is in the range of 0.60 to 0.70, in other words, when the percent hollowness H of each roller is between 60% and 70% and the preload factor P is between 0.001 and 0.0015. As noted above, preload factor P is the ratio of the total operating interference between the rollers and the raceways designated herein as I, to the outer diameter $D_o$ of each of the rollers. Total operating interference I therefore, is equal to the radius $r_o$ of the outer raceway 21 less the radius $r_i$ of the inner raceway 19 less the outer diameter $D_o$ of one of the rollers.

By way of example, investigations were conducted on a roller bearing assembly having the following characteristics wherein applied radial load was varied between 5,000 and 13,000 lbs. and the shaft speed varied between 5,000 and 15,000 r.p.m. The results obtained showed that this bearing with 60% hollow rollers and a preload factor P of 0.0012 had approximately 40 times greater fatigue life than a similar bearing with solid rollers.

CHART A

| | |
|---|---|
| Number of rollers per row | 21 |
| Number of rows | 1 |
| Roller diameter $D_o$ _____inch__ | .55 |
| Bearing pitch diameter _____do____ | 4.5 |
| $I/D_o$ | 0.0012 |
| Percent hollowness | 60% |

Figure 9:
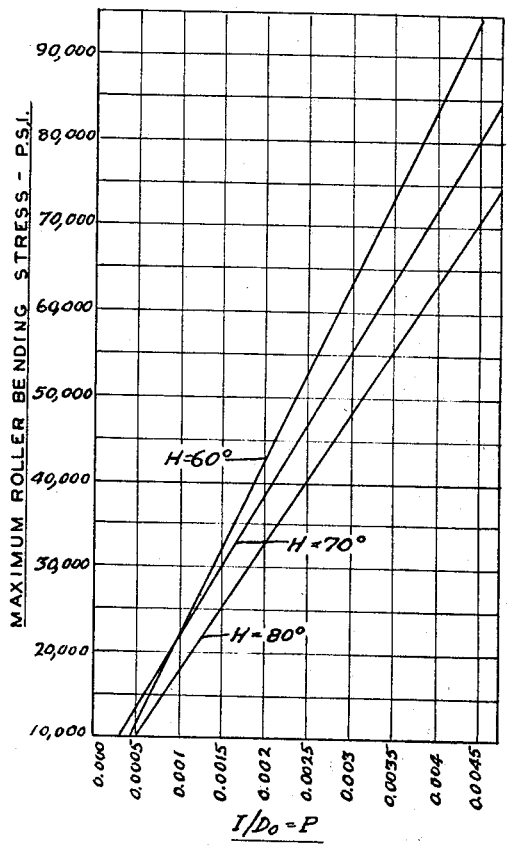
FIG. 9 is a chart showing roller bending stress in relation to preload factor P for the first embodiment of the invention.
Figure 10:
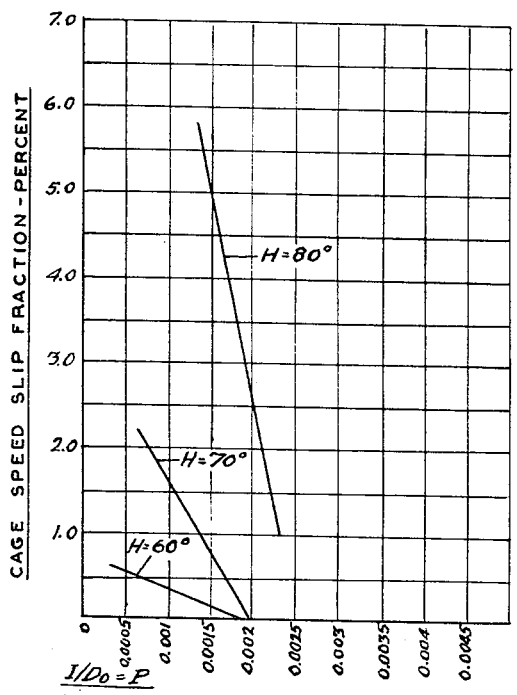
FIG. 10 is a chart plotting cage speed slip fraction against preload factor P for the first embodiment of the invention.
Figure 12:
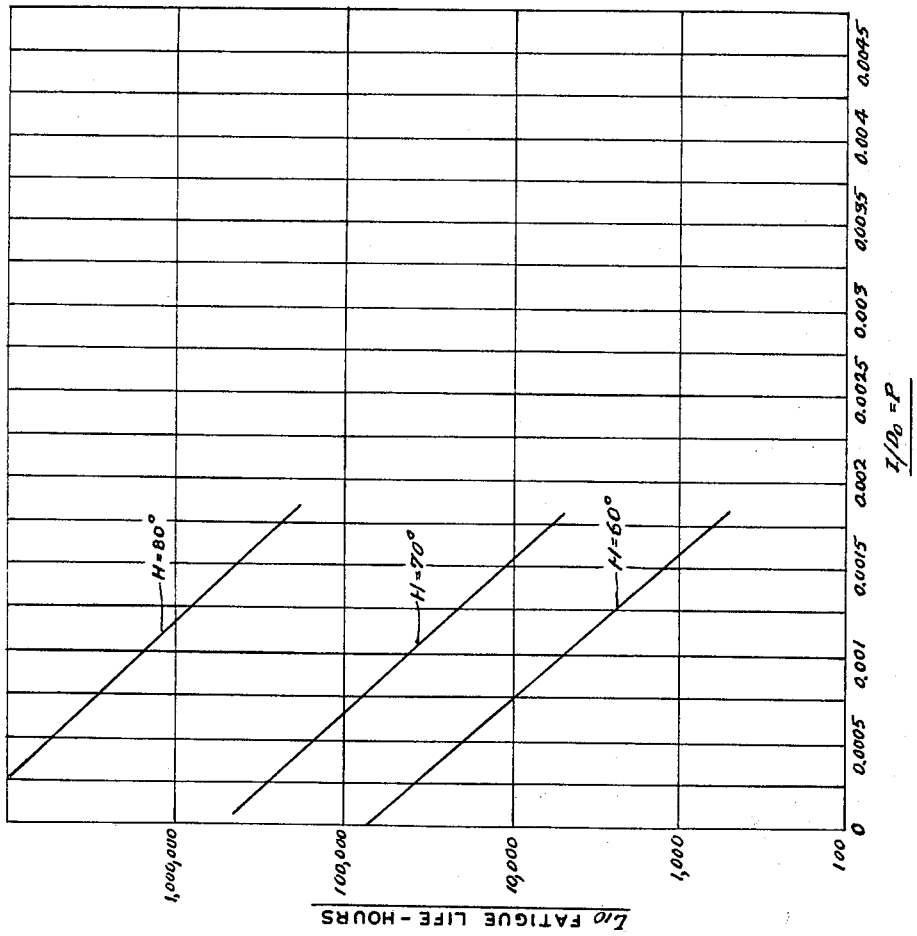
FIG 12 is a chart plotting bearing life in relation to percent hollowness and preload factor P for the first embodiment of the invention.
Figure 11:
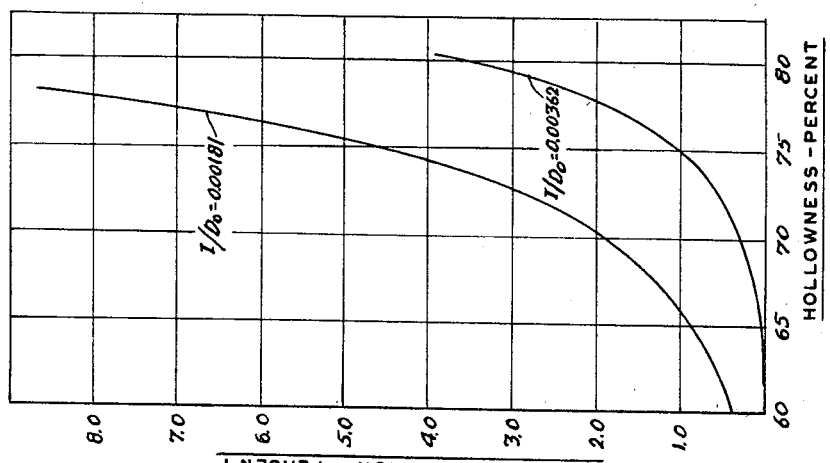
FIG. 11 is a chart plotting cage slip fraction against roller hollowness in percent for the first embodiment of the invention.

A study, the results of which are plotted in chart form in FIGS. 8–12 inclusive, demonstrates that particularly in high speed, light load bearing applications, a bearing assembly in accordance with the present invention will operate with a minimum of cage and roller speed slippage and a minimum of roller bending stress while optimizing the $L_{10}$ fatigue life of the bearing. For example, in FIG. 8, percent hollowness was plotted against roller bending stress and preload factor P or $I/D_o$ was varied. The results demonstrate that within the selected range of hollowness, that is, between 60% and 70% and below the upper limit of preferred range of $I/D_o$, that is, below 0.0015, the roller bending stress is substantially lower than the endurance limit of most bearing materials. As the preload factor P increases above 0.0015, the roller bending stress increases. However, FIG. 9 shows that when the preload factor P goes below the lower limit of the preferred range, that is, below 0.001, the percent of the cage speed slip fraction increases, which means that skidding increases. FIG. 9 also demonstrates that when the percent hollowness increases above the upper limit of the preferred range, that is, above 70%, the skidding characteristic is also bad and FIG. 11 demonstrates when the percent hollowness is reduced below the preferred lower limit of 60%, fatigue life decreases. It is noted that skidding below 10% is generally acceptable. FIG. 9 shows that in the preferred range of the preload factor P and in the preferred range of percent hollowness, roller bending stresses are in a desirable range below the endurance limit of most bearing materials. FIG. 11 demonstrates that in the preferred range of percent hollowness and preload factor P, the cage speed slip fraction is in a desired range, that is below 10%. It is noted also with respect to FIG. 12, that in the preferred ranges of hollowness and preload factor P, the $L_{10}$ is above 1,000 hours as contrasted with solid rollers of conventional rolling bearings where under high speed and light load the $L_{10}$ is usually well below 100 hours. A bearing in accordance with the present invention also operates effectively under conditions of high load and low speeds and exhibits an increased fatigue life and tolerable bending stresses. Under such heavy loading speed slippage does not occur. Studies of bearings in accordance with the present invention wherein the load was varied, indicate that the $L_{10}$ fatigue life for example, of the bearing assembly of chart A, was approximately 40 times greater than the fatigue life of the same bearing assembly with solid rollers. Additionally, with these magnitudes of interference and light radial load, the internal load distribution of the bearing is virtually uniform, i.e., all rollers are approximately equally loaded. This uniform distribution implies that all the rollers are driving the cage, thus eliminating the drag effect on unloaded rollers.

In summary, therefore, a roller bearing assembly in accordance with the present invention has the following advantages. The weight of the entire assembly is reduced by the use of hollow rollers and this also facilitates increased heat removal capacity. As noted above, there is an increased fatigue life due to the flexibility of the rollers. The range of hollowness and preload factor P in the loaded zone of the bearing is important for the reason that annular roller bending stress increases with increasing hollowness for a given applied radial load. In applications where the bearing is subjected to high speed and light load, skidding in the loaded zone is reduced and as it is clear from FIGS. 8-12 the selected range of percent hollowness and preload factor P minimizes adverse effects of roller bending stress and increases roller surface fatigue life.

There is illustrated in FIGS. 4 and 5, another embodiment of roller bearing assembly in accordance with the present invention. The bearing assembly is similar in overall configuration to the first embodiment described and includes an inner ring 112 mounted on a shaft 114, an outer ring 116 mounted in a housing 118, a plurality of rollers 120 in the annular space between the inner and outer raceways 119 and 121 of the rings, and a cage 123 for circumferentially spacing the rollers.

It has been found that another means to minimize cage speed slippage is to selectively radially preload the solid rollers. To this end one of the rings of the bearing assembly which remains sationary relative to the points of application to the load is formed with an out-of-round raceway and the other ring is made with a circular raceway. In the present instance, the outer ring 116 is keyed to the housing and is stationary relative to the diametrically opposed points of load application and thus, as illustrated, is oval-shaped or elliptical having an oval-shaped or elliptical raceway 119 with the major axis $A_m$ aligned in a plane $P_L$ passing through diametrically opposed points $P_1$ and $P_2$ of application of the force components of the bearing assembly and the minor axis $B_m$ passing through a diametrically opposed loaded zone $Z_L$ of the rollers and the inner ring has a circular raceway thus providing a greater radial space between the raceways at the diametrically opposed points $P_1$ and $P_2$, this arrangement being referred to herein as two point out-of-round.

Even though this arrangement with solid rollers generally is effective to produce an increased resistance to cage speed slippage and hence fatigue, it has been found that the $L_{10}$ life may be increased further by use of selectively preloaded rollers. More specifically this preload factor P' in the zone $Z_L$ is achieved by providing an interference $I_1$ which is equal to the radius $r_o$ of the outer raceway 121 at the minor axis $B_m$ less the radius $r_i$ of the inner raceway 119 less the outer diameter $D_o$ of one of the rollers 120. More specifically it has been found that the preferred range of hollowness of the rollers is between 60% and 70% and the ratio of $I_1$ to $D_o$ of the rollers is between 0.003 and 0.007.

There is illustrated in FIGS. 6 and 7 still another embodiment of roller bearing assembly in accordance with the present invention. This bearing assembly is also similar in overall configuration to the embodiments described above and includes an inner ring 212 mounted on a shaft 214, an outer ring 216 mounted in a housing 218, a plurality of rollers 220 in the annular space between the inner and outer raceways 219 and 221 of the rings and a cage 223 circumferentially spacing the rollers.

In the present instance the bearing assembly is particularly adapted to provide radial preloading at three circumferentially equispaced locations and this is termed a three point out-of-round assembly.

To this end and in view of the concept discussed above in connection with the embodiment of FIGS. 4 and 5, the outer ring, which is stationary relative to the three circumferentially equispaced points $P_3$, $P_4$, and $P_5$ of load application, is formed with a three point out-of-round or generally triangularly shaped raceway 221, hereinafter referred to as "trilobar," and inner ring 212 has a circular raceway thus providing three circumferentially equispaced zones $A_1$, $A_2$ and $A_3$ between the raceways and three circumferentially equispaced zones $B_1$, $B_2$ and $B_3$ between the clearance zones $A_1$, $A_2$ and $A_3$ where the rollers are preloaded. The "trilobar" outer raceway therefore has three axes $T_a$ of identical dimension, one end of each axis $T_a$ being adjacent the zones $A_1$, $A_2$ and $A_3$, the point of external load application $P_3$, $P_4$, and $P_5$ and the other end of each axis $T_a$ being adjacent the preload zone $B_1$, $B_2$ and $B_3$ of the rollers. This arrangement of selective preloading between the rollers and the raceways provides improved resistance to cage speed slippage and hence increased fatigue life. However, $L_{10}$ may be increased even further in these applications by the use of hollow rollers and a predetermined preloading of the rollers in the zones $A_1$, $A_2$ and $A_3$. More specifically, it has been found that the harmful effects of roller bending stress are minimized and $L_{10}$ life is at an optimum by providing a preload factor P" in the zones $A_1$, $A_2$ and $A_3$ in the range of 0.0015 to 0.0025 where P" is equal to $I_2/D_o$, $I_2$ being the smallest radius $r_o$ of the outer raceway 221 at the axis $T_a$ less the radius $r_i$ of the inner raceway less the outer diameter $D_o$ of one of the rollers 220 and by making the rollers 220 with a percent hollowness of between 60% and 70%.

It is noted that in connection with the two point out-of-round arrangement shown in FIGS. 4 and 5 and the three point out-of-round arrangement shown in FIGS. 6 and 7, in lieu of the outer raceway being elliptical and "trilobar," the inner raceway may be made elliptical or "trilobar" to provide the desired preloading of the rollers in the preload zones of the beaing in the manner discussed above. The bearing assembly may be designed either with an out-of-round inner ring or an out-of-round outer ring depending on which ring is fixed relative to the external application of load. Thus, in the embodiments illustrated, the outer ring is fixed relative to the external by applied load and hence the outer raceway is formed out-of-round.

While particular embodiments of the present invention have been illustrated and described herein, it is of course, to be understood that changes and modifications may be made herein, within the scope of the following claims.

We claim:

1. A roller bearing assembly comprising inner and outer rings having confronting inner and outer raceways respectively and a plurality of rollers in the annular space between the rings, said rollers being hollow and being within a predetermined percent range of hollowness, the annular space between said inner and outer raceways being less than the outer diameter of the rollers at least at localized zones to preload the rollers with a predetermined preload factor P thereby to improve the resistance to skidding and increase the fatigue life of the bearing assembly.

2. A hearing assembly as claimed in claim 1 wherein the inner and outer raceways are concentric.

3. A bearing assembly as claimed in claim 2 wherein the inner and outer raceways are circular.

4. A bearing assembly as claimed in claim 3 wherein the preload factor is equal to the ratio of $I/D_o$ and is preferably in the range of 0.001 and 0.0015, where I being defined as total operating interference is equal to the diameter of the outer raceway less the diameter of the inner raceway less the product of twice the outer diameter $D_o$ of one of the rollers and the percent hollowness of each of the rollers is between 60% and 70%.

5. A bearing assembly comprising inner and outer rings having confronting inner and outer raceways respectively and a plurality of rollers in the annular space between the rings, said rollers being hollow and being within a predetermined percent range of hollowness, the annular space between said inner and outer raceways being less than the outer diameter of the rollers at least at localized zones to preload the rollers with a predetermined preload factor P thereby to improve the resistance to skidding and hence increase the fatigue life of the bearing assembly, said assembly adapted for use in applications where one of the rings remains stationary relative to the direction of application of the external load, the raceway of said one ring being out-of-round and disposed relative to said direction of load application to provide a diametral clearance between the rollers and the raceways in the direction of load application and said preload zones being intermediate the clearance zones.

6. A bearing assembly as claimed in claim 5 wherein the outer ring is stationary relative to the direction of application of the external load and wherein said outer raceway is elliptical having transversely disposed major and minor axes and wherein said major axis is disposed in a plane in the direction of load application.

7. A bearing assembly as claimed in claim 6 wherein the preload factor P at said preload zones, expressed by the ratio of $I/D_o$, is equal to between 0.003 and 0.007 where I equals the diameter of the outer raceway at said minor axis less the diameter of the inner raceway less the product of twice the outer diameter $D_o$ of one of the rollers and the percent hollowness of each of the rollers is between 60% and 70%.

8. A bearing assembly as claimed in claim 5 wherein said outer raceway is trilobar and the inner raceway is circular thereby providing three circumferentially equispaced zones wherein there is a clearance between the raceways and the rollers and preload zones intermediate said clearance zones wherein the rollers are preloaded, the preload factor P in said preload zones expressed by the ratio of $I/D_o$ is equal to between 0.0015 and 0.0025 where I being defined as total operating interference is equal to the space between the raceways at said preload zone, the outer diameter $D_o$ of one of the rollers and the percent hollowness of each of the rollers is between 60% and 70%.

References Cited

UNITED STATES PATENTS

| | | | |
|---|---|---|---|
| 873,481 | 12/1907 | Cole | 308—215 X |
| 924,387 | 6/1909 | Shirley | 308—215 X |
| 2,340,334 | 2/1944 | Maris | 308—35 X |
| 2,720,434 | 10/1955 | Trbojevich | 308—202 |
| 2,943,894 | 7/1960 | Brook | 308—212 |
| 2,983,029 | 5/1961 | Perin et al. | 308—212 X |
| 3,301,611 | 1/1967 | Dunlap. | |
| 3,337,278 | 8/1967 | Vigh | 308—212 X |

MARTIN P. SCHWADRON, *Primary Examiner.*

CARROLL B. DORITY, *Assistant Examiner.*